(12) United States Patent
Yu

(10) Patent No.: US 8,492,944 B2
(45) Date of Patent: Jul. 23, 2013

(54) STEP MOTOR

(75) Inventor: Hyunsoo Yu, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 436 days.

(21) Appl. No.: 12/981,175

(22) Filed: Dec. 29, 2010

(65) Prior Publication Data
US 2011/0156517 A1    Jun. 30, 2011

(30) Foreign Application Priority Data
Dec. 31, 2009    (KR) .................. 10-2009-0135329

(51) Int. Cl.
*H02K 5/16*    (2006.01)
*H02K 7/08*    (2006.01)

(52) U.S. Cl.
USPC ............................. 310/90; 310/89

(58) Field of Classification Search
USPC ............................. 310/83, 89, 90
See application file for complete search history.

(56) References Cited

U.S. PATENT DOCUMENTS

| | | | |
|---|---|---|---|
| 6,747,382 B2 * | 6/2004 | Yajima et al. | 310/90 |
| 2002/0057028 A1 * | 5/2002 | Yajima et al. | 310/194 |
| 2002/0084709 A1 * | 7/2002 | Yajima et al. | 310/90 |
| 2003/0178897 A1 * | 9/2003 | Jun | 310/90 |
| 2006/0028078 A1 * | 2/2006 | Agematsu | 310/90 |
| 2007/0216243 A1 * | 9/2007 | Agematsu | 310/90 |

FOREIGN PATENT DOCUMENTS

| | | |
|---|---|---|
| CN | 1194487 A | 9/1998 |
| JP | 3379890 B2 | 2/2003 |
| JP | 2007-082341 A | 3/2007 |
| JP | 2007-282335 A | 10/2007 |
| KR | 10-2007-0030382 A | 3/2007 |
| KR | 10-2009-0104405 A | 10/2009 |

OTHER PUBLICATIONS

Office Action dated Jan. 16, 2013 in Chinese Application No. 201010624262.7.

* cited by examiner

*Primary Examiner* — Tran Nguyen
*Assistant Examiner* — David Scheuermann
(74) *Attorney, Agent, or Firm* — Saliwanchik, Lloyd & Eisenschenk

(57) ABSTRACT

Provided is a step motor including a rotor in which a lead screw is coupled with a magnet; a stator in which the rotor is rotatably inserted and which applies a magnetic field to the rotor; a thrust bearing which supports an end of the lead screw; a housing in which the stator is received, and a guide part opened at one side thereof is protruded, and the thrust bearing is inserted into the guide part; a plate spring which is provided at an opened portion of the guide part so as to apply elastic force to the thrust bearing and thus inhibit deviation of the lead screw and the thrust bearing; and a plate spring guide which is fixed to an outside of the guide part of the housing so that the plate spring is inserted therein.

20 Claims, 4 Drawing Sheets

STEP MOTOR

CROSS-REFERENCE TO RELATED APPLICATION

This application claims the benefit under 35 U.S.C. §119 of Korean Patent Application No. 10-2009-0135329, filed Dec. 31, 2009, which is hereby incorporated by reference in its entirety.

BACKGROUND OF THE DISCLOSURE

1. Field of the Invention

The present invention relates to a step motor, and particularly, to a step motor in which a pressing structure of a thrust bearing supporting an axial end of a lead screw is improved.

2. Discussion of the Related Art

Generally, a step motor is widely used in various fields such as an optical apparatus, a printer and an automatically controlled machine tool. In the step motor, a transfer member is engaged with a lead screw so as to be transferred in an axial direction by driving of the motor.

The step motor typically includes a rotor including a lead screw, a stator having a cylindrical shape in which the rotor is received in the stator, a housing which receives the rotor and the stator, a thrust bearing which presses an end of the lead screw, a coil spring which presses the thrust bearing, and a cap which inhibits deviation of the coil spring.

In the conventional step motor, the rotor is disposed inside the stator, the stator is received in the housing, the thrust bearing is disposed in the housing, the coil spring is assembled at the thrust bearing, and then the cap is fixed to the housing.

However, the conventional step motor has some problems in that it is difficult to fix the cap to the housing after the coil spring is disposed at the thrust bearing, and also it is not facile to perform assembling operations due to the deviation of the coil spring and the like.

BRIEF SUMMARY

An embodiment of the present invention is directed to providing a step motor which has an improved assembly characteristic.

To achieve the object of the present invention, the present invention provides a step motor comprising; a rotor in which a lead screw is coupled with a magnet; a stator in which the rotor is rotatably inserted and which applies a magnetic field to the rotor; a thrust bearing which supports an end of the lead screw; a housing in which the stator is received, and a guide part opened at one side thereof is protruded, and the thrust bearing is inserted into the guide part; a plate spring which is provided at an opened portion of the guide part so as to apply elastic force to the thrust bearing and thus inhibit deviation of the lead screw and the thrust bearing; and a plate spring guide which is fixed to an outside of the guide part of the housing so that the plate spring is inserted therein.

DETAILED DESCRIPTION

The advantages, features and aspects of the invention will become apparent from the following description of the embodiments with reference to the accompanying drawings, which is set forth hereinafter.

Figure 1:
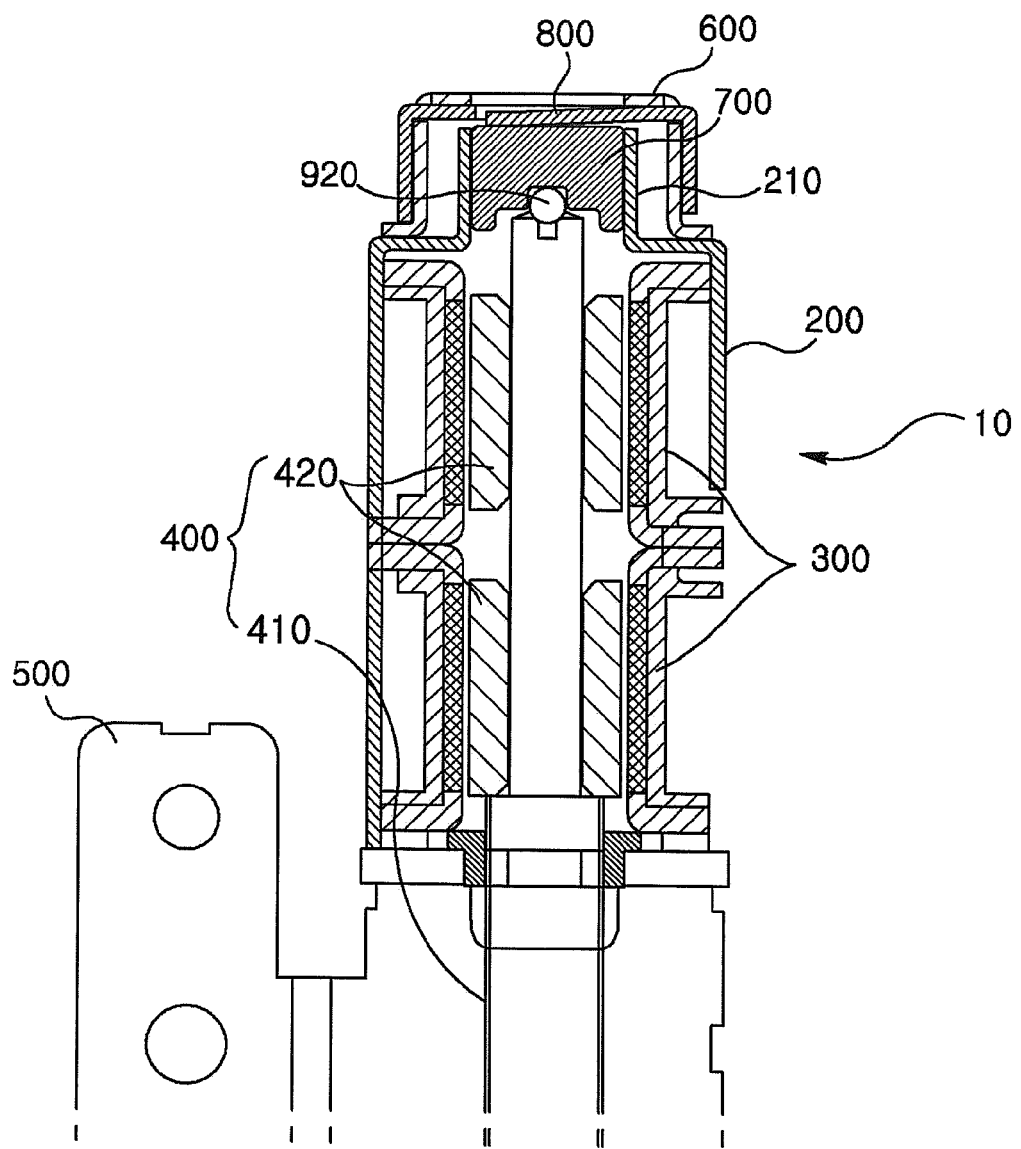
FIG. 1 is a cross-sectional view of a housing assembly structure of a step motor according to the present invention.

FIG. 1 is a cross-sectional view of a housing assembly structure of a step motor according to the present invention.

Referring to FIG. 1, a step motor of the present invention includes a housing 200, a stator 300, a rotor 400, a bracket 500, a plate spring guide 600, a thrust bearing 700 and a plate spring 800.

An opening part is formed at one side of the housing, and a guide part 210 is formed at the other side of the housing so as to guide a bearing device in an axial direction.

The stator 300 is disposed inside the housing 200 so as to form a magnetic field.

The rotor 400 includes a lead screw 410, and a magnet 420 which is fixed to a part of the lead screw 410. The magnet 420 is inserted into the stator 300 so as to have a desired gap, and the lead screw 410 is rotatably supported by the bearing device.

The bracket 500 is provided with a first part which one end of the magnet 420 is inserted into and passed through and which is bonded to an opened surface of the housing 200, and a second part in which the other end of the magnet 420 passing through the first part is rotatably supported.

The plate spring guide 600 is disposed outside the guide part 210 of the housing 200, and also has an assembling hole 610 formed at an upper side thereof. Further, the plate spring guide 600 is welded to an outside of the guide part 210 of the housing 200.

In one embodiment of the present invention, the plate spring guide 600 and the guide part 210 of the housing 200 are fixed to each other by spot welding. However, other welding method like laser welding may be used. In some cases, a bonding method may be considered.

As described above, in order to assemble the plate spring 800, the plate spring guide 600 is fixed to the outside of the guide part 210, i.e., a surface of the housing 200 by the spot welding.

The thrust bearing 700 is assembled to the guide part 210 of the housing 200 through the assembling hole 610 of the plate spring guide 600. The thrust bearing 700 is elastically pressed by a pressing plate of the plate spring 800.

The thrust bearing 700 is formed into a cap shape so as to be guided through the guide part 210 of the housing 200.

The plate spring 800 is assembled to the plate spring guide 600 so as to press the thrust bearing 700. The plate spring 800 functions to provide pre-load so that the lead screw 410 can be rotated precisely.

Figure 2:
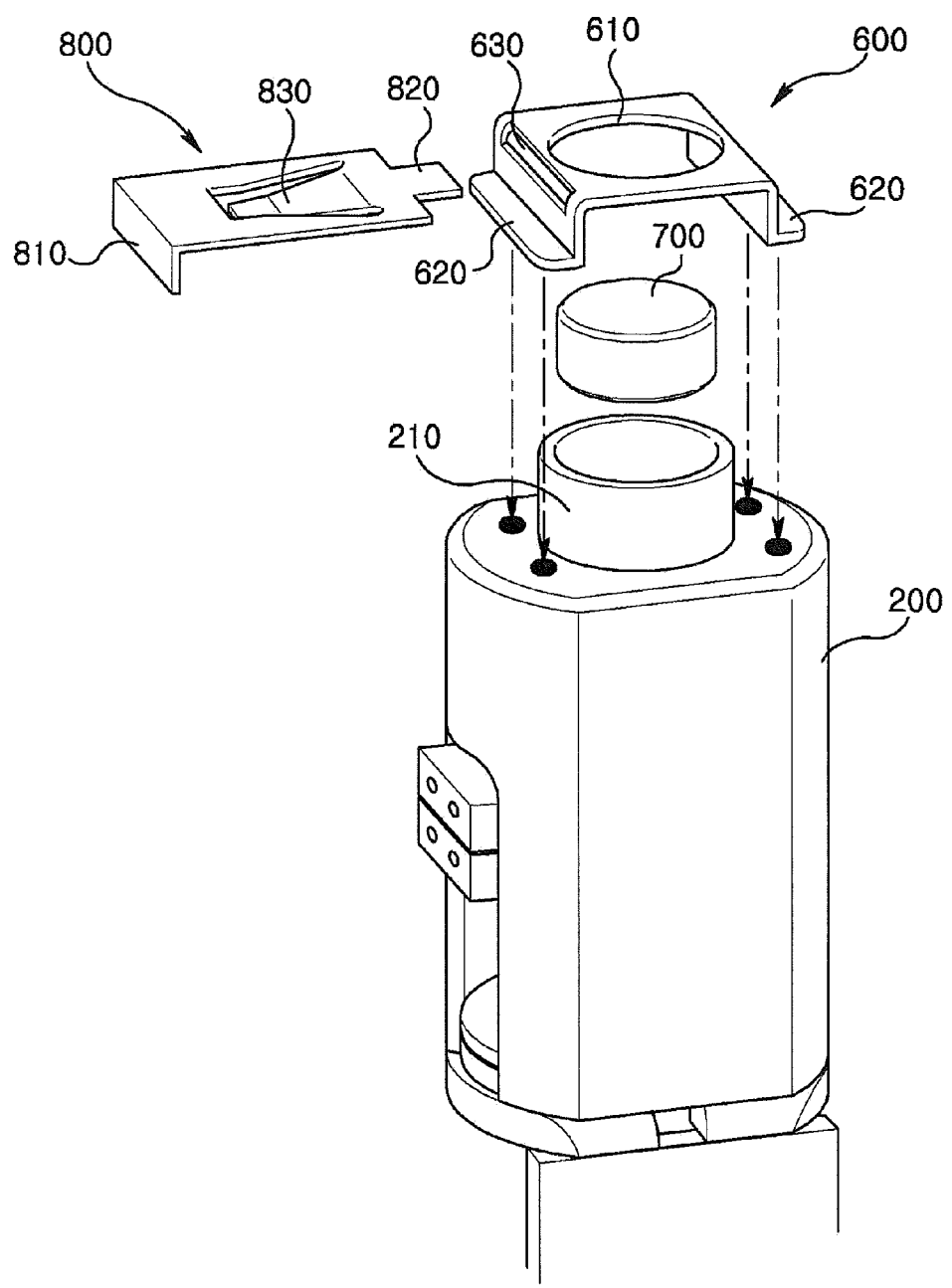
FIG. 2 is an exploded perspective view of a housing of the step motor according to an embodiment of the present invention.

FIG. 2 is an exploded perspective view of a housing of the step motor according to an embodiment of the present invention.

Referring to FIG. 2, an assembling member 620 is formed at lower left and right sides of the plate spring guide 600 assembled to the housing 200 of the step motor 10 so as to be fixed to the outside of the guide part 210 of the housing 200 by the spot welding. The assembling member 620 is bent in a horizontal direction, and contacted with the surface of the housing 200, and then fixed to the housing 200 through the spot welding.

The assembling hole 610 of the plate spring guide 600 and the guide part 210 of the housing 200 are maintained in a state that they are corresponded to each other, and various components and the thrust bearing 700 are assembled in the housing 200 through the assembling hole 610.

Further, a slit hole 630 is formed at both sides of the plate spring guide 600 so that the plate spring 800 is inserted into the slit hole 630. A bent part 810 is formed at one end of the plate spring 800, and a protrusion 820 is formed at the other end thereof. The bent part 810 is contacted with one side of the plate spring guide 600, and the protrusion 820 of the plate spring 800 is fixedly bent at the other side thereof.

That is, the plate spring guide 600 is assembled to the housing 200 of the step motor 10 through the spot welding. In this situation, the rotator 400, the ball 920 and the thrust bearing 700 are assembled, in turn, through the assembling hole 610 of the plate spring guide 600. Then, the plate spring 600 is inserted into the plate spring guide 600, and the protrusion 820 is bent, thereby assembling the plate spring 800 to the plate spring guide 600.

The plate spring 800 is provided with a pressing plate 830, and the thrust bearing 700 is elastically pressed by the pressing plate 830.

Accordingly, it is possible to easily assemble the various components, the plate spring guide 600, the thrust bearing 700 and the plate spring 800 to the housing 200 of the step motor 10.

Figure 3:
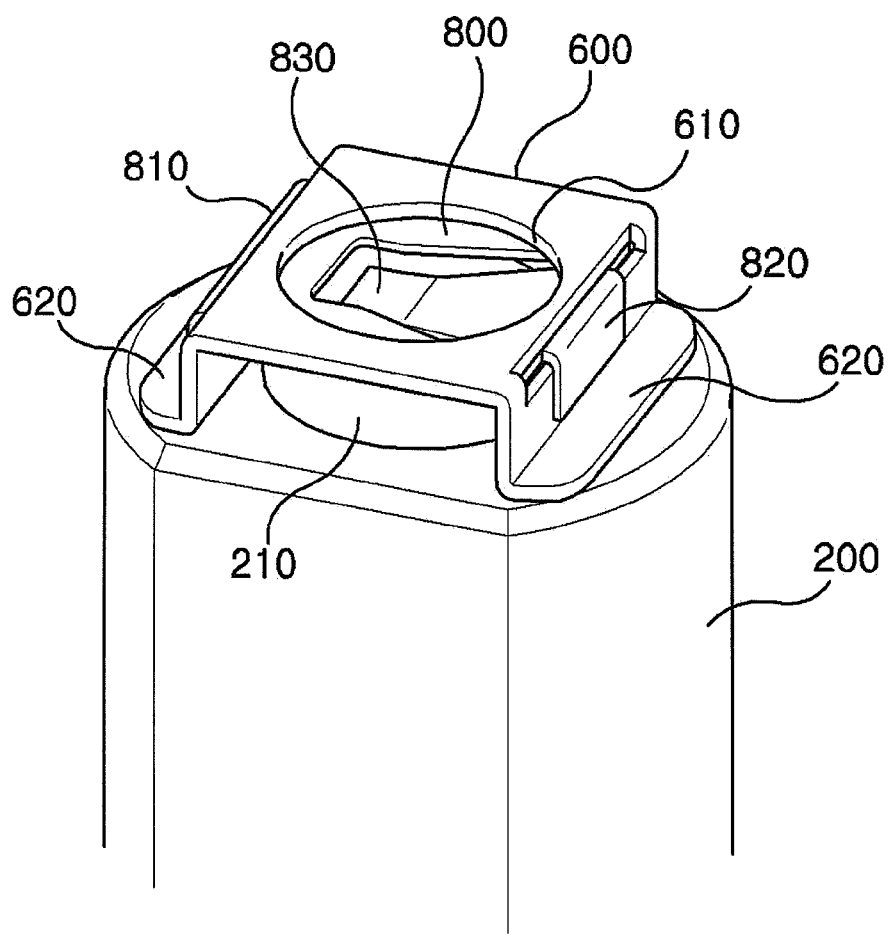
FIG. 3 is a perspective view showing an assembled state of the housing according to the present invention.

FIG. 3 is a perspective view showing an assembled state of the housing according to the present invention.

Referring to FIG. 3, the protrusion 820 of the plate spring 800 which is assembled to the plate spring guide 600 is bent downward so as to be fixed to the plate spring guide 600. That is, by bending the protrusion 820 which is horizontally protruded, it is inhibited that the plate spring 800 is deviated from the plate spring guide 600.

As described above, the plate spring 800 is provided with the pressing plate 830 which applies elastic force downwardly, and thus the thrust bearing 700 is elastically pressed and supported by the pressing plate 830.

The thrust bearing 700 inserted into the guide part 210 of the housing 200 is elastically fixed by using the pressing plate 830 of the plate spring 800.

Figure 4:
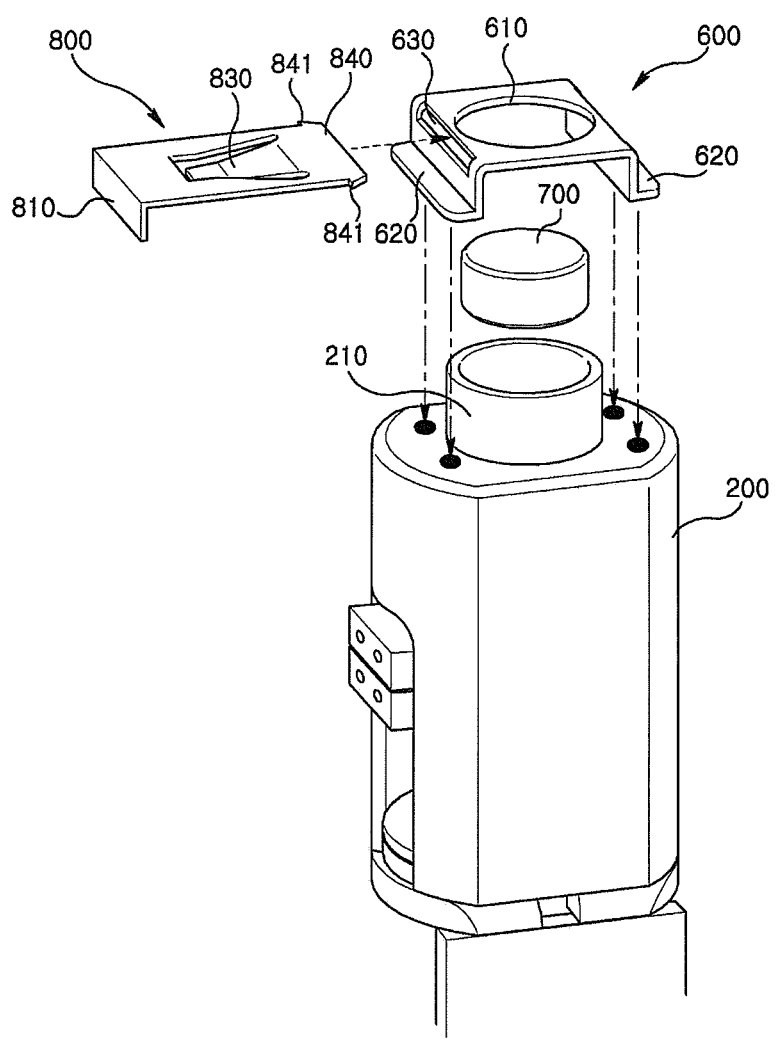
FIG. 4 is an exploded perspective view of a housing of the step motor according to another embodiment of the present invention.

FIG. 4 is an exploded perspective view of a housing of the step motor according to another embodiment of the present invention.

Referring to FIG. 4, a bending part 810 is formed at one end of the plate spring 800, and an insertion member 840 is formed at the other end thereof. A hooking protrusion 841 is formed at both sides of the insertion member 840. Therefore, if the insertion protrusion 841 is inserted into a slit hole 630 of the plate spring guide 600, the hooking protrusion 841 of the insertion member 840 is hooked with both external ends of the slit hole 630, and thus the plate spring 800 is fixed.

In other words, the slit hole 630 is formed at both sides of the plate spring guide 600 so that the plate spring 800 is inserted into the slit hole 630. Since the bending part 810 is formed at one end of the plate spring 800, and the insertion member 840 is formed at the other end thereof, and the hooking protrusion 841 is formed at both sides of the insertion member 840, the bending part 810 is contacted with one side of the plate spring guide 600, and the hooking protrusion 841 of the insertion member 840 is fixedly hooked at the other side thereof.

Therefore, since the assembling characteristic of the step motor 10 is enhanced and the components are simply assembled, it is possible to improve workability and productivity and also to minimize poor assembling, thereby increasing the quality of product and reducing the manufacturing cost.

While the present invention has been described with respect to the specific embodiments, it will be apparent to those skilled in the art that various changes and modifications may be made without departing from the spirit and scope of the invention as defined in the following claims.

What is claimed is:

1. A step motor, comprising:
   a rotor in which a lead screw is coupled with a magnet;
   a stator in which the rotor is rotatably inserted and which applies a magnetic field to the rotor;
   a thrust bearing which supports an end of the lead screw;
   a housing in which the stator is received, and a guide part opened at one side thereof is protruded, and the thrust bearing is inserted into the guide part;
   a plate spring which is provided at an opened portion of the guide part so as to apply elastic force to the thrust bearing and thus inhibit deviation of the lead screw and the thrust bearing; and
   a plate spring guide which is fixed to an outside of the guide part of the housing so that the plate spring is inserted therein.

2. The step motor of claim 1, wherein the plate spring is extended orthogonally to an axial direction of the lead screw, and one side and the other side of the plate spring are inserted into a slit hole formed at the plate spring guide so that both ends of the plate spring are supported.

3. The step motor of claim 2, wherein a bent part is formed at one end of the plate spring.

4. The step motor of claim 3, wherein a protrusion is formed at the other side of the plate spring, and the protrusion is bent after being inserted into the slit hole to inhibit the plate spring from being separated from the plate spring guide.

5. The step motor of claim 3, wherein the bent part and the protrusion face each other.

6. The step motor of claim 1, wherein the plate spring guide comprises an assembling member which is formed by bending both ends of a flat plate toward the guide part, and the assembling member is coupled to the housing corresponding to an outside of the guide part.

7. The step motor of claim 6, wherein the assembling member is coupled to the housing corresponding to an outside of the guide part.

8. The step motor of claim 7, wherein the assembly member and the housing are coupled to each other by laser-welding or spot-welding.

9. The step motor of claim 7, wherein the assembly member is bonded to the housing corresponding to the guide part.

10. The step motor of claim 7, wherein the assembly member is higher than the guide part.

11. The step motor of claim 1, wherein the plate spring guide is formed with a centrally-opened assembling hole, and the plate spring is centrally formed with a pressing plate.

12. The step motor of claim 11, wherein the pressing plate is protruded toward the thrust bearing so as to elastically press a part of the thrust bearing through the assembling hole of the plate spring guide.

13. The step motor of claim 11, wherein the pressing plate is formed at an acute angle relative to plate spring.

14. The step motor of claim 11, wherein the pressing plate is formed in the shape of a cantilever, and the pressing plate includes a slant part inclined to the thrust bearing, and a contact part formed in parallel with the thrust bearing.

15. The step motor of claim 11, wherein the contact part contacting the thrust bearing in the pressing plate and the slant part are formed at an obtuse angle relative to each other.

16. The step motor of claim 1, wherein the plate spring is bent at one side thereof, and is formed at the other side with an insertion member.

17. The step motor of claim 16, wherein the insertion member is protruded from both lateral surfaces of the plate spring.

18. The step motor of claim 16, wherein the bent part is formed at a right angle relative to the plate spring.

19. The step motor of claim 16, wherein a hooking protrusion is formed at both sides of the insertion member, and the insertion protrusion is inserted into the slit hole of the plate spring guide, and the hooking protrusion of the insertion member is hitched by both external ends of the slit hole, and thus the plate spring is fixed.

20. The step motor of claim 1, wherein the thrust bearing takes the shape of a cylinder.

\* \* \* \* \*